(12) United States Patent
Koyama et al.

(10) Patent No.: US 7,469,063 B2
(45) Date of Patent: Dec. 23, 2008

(54) APPARATUS, METHOD AND STORAGE MEDIUM STORING PROGRAM FOR RECOGNIZING CHARACTERS

(75) Inventors: Toshiya Koyama, Nakai-machi (JP); Teruka Saito, Nakai-machi (JP); Masakazu Tateno, Nakai-machi (JP); Kei Tanaka, Nakai-machi (JP); Masayoshi Sakakibara, Ebina (JP); Kotaro Nakamura, Minato-ku (JP)

(73) Assignee: Fuji Xerox Co., Ltd., Tokyo (JP)

( * ) Notice: Subject to any disclaimer, the term of this patent is extended or adjusted under 35 U.S.C. 154(b) by 519 days.

(21) Appl. No.: 11/079,178

(22) Filed: Mar. 15, 2005

(65) Prior Publication Data

US 2006/0078200 A1 Apr. 13, 2006

(51) Int. Cl.
*G06K 9/00* (2006.01)
*G06K 7/10* (2006.01)
*G06K 9/20* (2006.01)
*H04N 1/04* (2006.01)

(52) U.S. Cl. .................. 382/187; 382/321; 358/474; 358/498

(58) Field of Classification Search .......... 382/187, 382/321; 358/474–498
See application file for complete search history.

(56) References Cited

U.S. PATENT DOCUMENTS 6,643,401 B1 * 11/2003 Kashioka et al. .......... 382/197
6,909,805 B2 * 6/2005 Ma et al. .................. 382/170

FOREIGN PATENT DOCUMENTS

JP A 2000-331122 11/2000

* cited by examiner

*Primary Examiner*—Matthew C Bella
*Assistant Examiner*—Randolph Chu
(74) *Attorney, Agent, or Firm*—Oliff & Berridge, PLC

(57) ABSTRACT

An apparatus for recognizing characters includes a text structure analyzing unit that analyzes an input image of text composed of mixed typed and handwritten characters and separates the input text image into predefined text imaging regions, a character clipping unit that clips characters one by one in each of the text imaging regions separated by the text structure analyzing unit, a feature vectors calculating unit that calculates feature vectors of the clipped characters for each of the text imaging regions, a feature vectors aggregating unit that aggregates the calculated feature vectors over a predefined range of the input text image, and a typed and handwritten character separation unit that separates characters involved in the input text image into the typed characters and the handwritten characters, based on a result of the aggregation by the feature vectors aggregating unit.

12 Claims, 7 Drawing Sheets

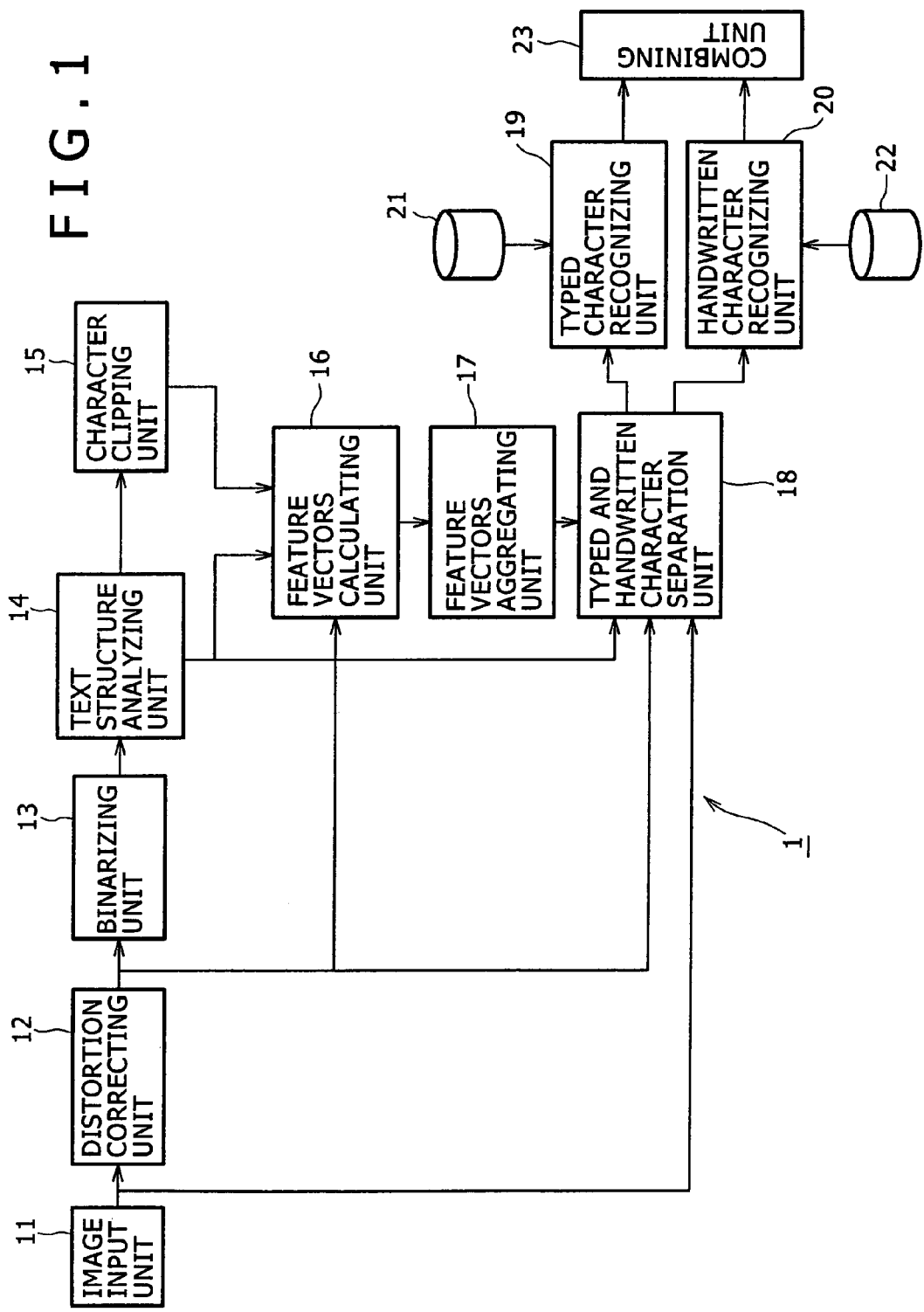

APPARATUS, METHOD AND STORAGE MEDIUM STORING PROGRAM FOR RECOGNIZING CHARACTERS

BACKGROUND OF THE INVENTION

1. Field of the Invention

The present invention relates to an apparatus, method, and program for recognizing characters of text. More particularly, the invention relates to such an apparatus, method, and program that are capable of enhancing the rate of recognition of handwritten characters in text composed of mixed typed and handwritten characters.

2. Description of the Related Art

Documents distributed in electronic form such as e-mail has been increasing in recent years, whereas there are a great amount of documents printed on paper. One reason for the latter fact is that it is easy to add some notes to printouts by handwriting. For instance, addition or revision to a draft document created by a personal computer (PC) or the like or adding notes to a document circulated to members of a conference is often made by handwriting. There is a need for scanning a document page including handwritten characters of additional notes with a scanner or the like and recognizing the characters on the page by Optical Character Reader (OCR) software, which is used for reconstructing the document page including the thus recognized handwritten characters.

However, heretofore, it has been unable to get a practical recognition rate for handwritten text information, unless the handwriting is strictly restricted by conditions such as specifying squares for each character or only numerical characters. This has been a bottleneck in conversion between online information and offline information. To improve the precision of recognizing both typed characters and handwritten characters, it is carried out to separate a typed text part and a handwritten text part and perform separate OCR processing for each part.

As a related art technique for recognizing characters in separated typed text and handwritten text parts, an optical character reading device is known. From data that has been read, this device clips character data in units of fields (character strings) and buffers clipped character data into a clip field buffer. A character kind discrimination unit determines the kind of the characters in a field. Based on the result of this decision, a recognition unit refers to a handwritten text dictionary or a typed text dictionary and recognizes the character data in the field buffer. However, according to this character reading device, a threshold for decision varies with different font types and personal styles of writing, which decreases the rate of recognition of handwritten characters.

An optical character reading device equipped with a printed character recognition section and a handwritten character recognition section is known. Both the above sections execute independent OCR operations on character data that has been read and either of the results of the operations which has a higher accuracy (certainty) is used. However, according to this character reading device, two separate processes of character recognition are performed, requiring more processing time.

A character kind discrimination device capable of recognition always using a dictionary suitable for a character kind is also known. In this device, a white-framed pattern is formed by surrounding binarized character information by one dot white pixel on all sides. To this white-framed pattern, each of 16 two-by-two dots patterns is matched, wherein each two-by-two dots pattern is made up of four pixels of two by two dots in different combinations of white and black pixels. Frequency of occurrence of each two-by-two dots pattern in the white-framed pattern is counted. A ratio between non-linear formation and linear formation of the two-by-two dots patterns is determined. However, according to this character kind discrimination device, the ratio of the linear part of a type character to the linear part of a handwritten character greatly varies with different font types, which decreases the rate of recognition of handwritten characters.

A label character recognition method enabling discrimination between handwritten characters and typed characters at high speed and high precision is also known. In this method, discrimination between handwritten characters and typed characters is made by the state of a line of characters before being clipped and, after character kind discrimination, each character part of image is clipped. By discrimination between vertical writing and horizontal writing, the character recognition method is changed and a character clipping error can be ignored. However, according to this label character recognition method, the ratio of the linear part of a type character to the linear part of a handwritten character greatly varies with different font types, which decreases the rate of recognition of handwritten characters.

SUMMARY OF THE INVENTION

The present invention has been made in view of the above circumstances and provides an apparatus, method, and program for recognizing characters, wherein the apparatus, method, and program are capable of enhancing the rate of recognition of handwritten characters in text composed of mixed typed and handwritten characters.

According to an aspect of the present invention, an apparatus for recognizing characters includes a text structure analyzing unit that analyzes an input image of text composed of mixed typed and handwritten characters and separates the input text image into predefined text imaging regions, a character clipping unit that clips characters one by one in each of the text imaging regions separated by the text structure analyzing unit, a feature vectors calculating unit that calculates feature vectors of the clipped characters for each of the text imaging regions, a feature vectors aggregating unit that aggregates the calculated feature vectors over a predefined range of the input text image, and a typed and handwritten character separation unit that separates characters involved in the input text image into the typed characters and the handwritten characters, based on the result of the aggregation by the feature vectors aggregating unit.

BRIEF DESCRIPTION OF THE DRAWINGS

Embodiments of the present invention will be described in detail based on the following figures, wherein:

FIG. 1 is a block diagram showing a character recognizing apparatus according an embodiment of the present invention;

FIGS. 3A, 3B, and 3C show a text image to be processed by the component units of the character recognizing apparatus of FIG. 1, wherein 3A shows the image of a manuscript page, 3B shows the text image that is input to a distortion correcting unit, and 3C shows the skew corrected text image output by the distortion correcting unit;

DETAILED DESCRIPTION OF THE INVENTION

Figure 2A:
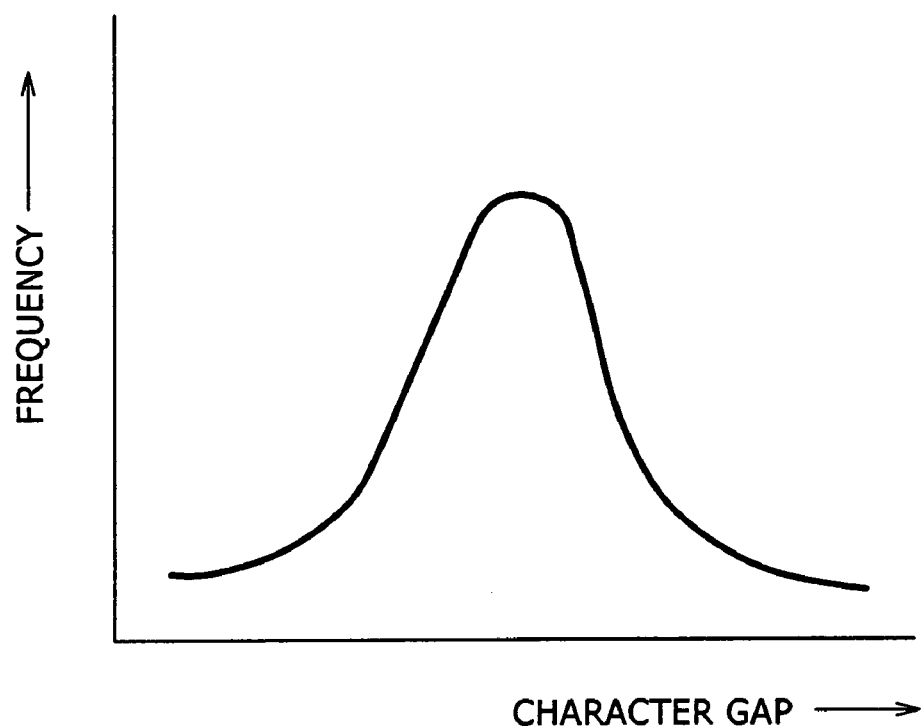
FIGS. 2A and 2B show graphs to explain the principle of calculating feature vectors for a feature vectors calculating unit shown in FIG. 1, wherein 2A is a frequency versus character gap characteristic graph for typed characters and 2B is the same graph for handwritten characters.

FIG. 1 shows a character recognizing apparatus according an embodiment of the present invention. The apparatus involves an image input unit 11 which scans text such as a manuscript, a distortion correcting unit 12 which performs skew correction, noise removal, and others on an entire text image captured by the image input unit 11, a binarizing unit 13 which binarizes the text image output by the distortion correcting unit 12, a text structure analyzing unit 14 which analyzes the text structure (layout) of the binarized text image, a character clipping unit 15 which clips characters from regions resulting from the layout analysis, a feature vectors calculating unit 16 which calculates feature vectors of clipped characters for each text imaging region, a feature vectors aggregating unit 17 which aggregates the feature vectors per text imaging region over the entire input text image, a typed and handwritten character separation unit 18 which separates the text image output by the image input unit 11 or the text image output by the distortion correcting unit 12 or the binarizing unit 13, which is not shown, into typed blocks and handwritten blocks, based on the feature vectors calculated by the feature vectors calculating unit 16 and the result of the analysis performed by the text structure analyzing unit 14, a typed character recognizing unit 19 which executes OCR processing on the typed blocks separated by the typed and handwritten character separation unit 18, a handwritten character recognizing unit 20 which executes OCR processing on the handwritten blocks separated by the typed and handwritten character separation unit 18, a typing dictionary 21 which is used for recognition processing of the typed character recognizing unit 19, a handwriting dictionary 22 which is used for recognition processing of the handwritten character recognizing unit 20, and a combining unit which combines characters recognized by the typed character recognizing unit 19 and characters recognized by the handwritten character recognizing unit 20 into a single file and a single text image.

The image input unit 11 is equipped with a platen made of transparent platen glass on which a manuscript page is positioned and a stationary imaging device such as a charge coupled device (CCD) to optically scan an image of the page positioned on the platen.

The distortion correcting unit 12 has a color to gray conversion function; that is, converting R, G, and B components in a color image of a page to be imaged into gray. When converting the R, G, and B color components into gray, this function uses any of the following:

(a) Gray values are obtained in terms of the G value in the color image.

(b) Gray values are obtained by 0.30 r+0.59 g+0.11 b, where r, g, and b are R, G, and B values in the color image.

(c) Gray values are obtained by $\alpha \times r + \beta \times g + \gamma \times b$, where $\alpha$, $\beta$, and $\gamma$ are coefficients changing, according to a color determined by color decision.

The binarizing unit 13 has a function to binarize text image data from the image input unit 11, according to a fixed threshold in terms of, e.g., density, or a dynamic threshold which is determined for a pixel by an average of density among its surrounding pixels.

The text structure analyzing unit 14 is equipped with a function to divide the input text image into blocks as plural text imaging regions, according to the distribution of characters and the like over the binarized text image and entity, wherein each block shows a distinct state of the distribution and contains a type of entity. In particular, the text image is divided into plural blocks by dividing the text image into paragraph or line regions or dividing into regions for different types such as text, figure, and photograph, and layout analysis is performed.

The character clipping unit 15 has a function to clip per line from the blocks made by the text structure analyzing unit 14 and then clip characters one by one.

The feature vectors calculating unit 16 has a function to calculate feature vectors per text imaging region on the result of the text structure analysis and the clipped characters in terms of the following feature components:

(1) Width and height of a character clipped, namely, character size that may vary. Typed characters have generally constant height and width unless points are altered, whereas the height and width of handwritten characters are likely to be unequal.

(2) Character gap that may vary (pitch of characters) The character gap is generally constant for typed characters, whereas it is likely to vary for handwritten characters.

(3) Centroid or the center of the circumscribed quadrangle of a character that may vary. Because of a difference in the number of component lines and points of a character, geometry thereof, etc., the centroid or the center of the circumscribed quadrangle of a character may differ from one character to another. This difference is likely to be significant for handwritten characters.

(4) Writing direction (angle) of a row or a column. A typed character string is formed in a right row or column, whereas a handwritten character string is often skewed, curved, or wavy.

(5) Values of pixels of a character that may vary (histogram). The pixels of a typed character have constant values and a peak of the values is easy to form. For a handwritten character, these values vary, showing broad characteristics.

The feature vectors aggregating unit 17 has a function to aggregate the feature vectors per text imaging region calculated by the feature vectors calculating unit 16 over the entire text image and calculate a separation coefficient to separate typed and handwritten characters.

The typed and handwritten character separation unit 18 has a function to separate all the text imaging regions in the text image from the image input unit 11, the distortion correcting unit 12, or the binarizing unit 13, which is not shown, into the typed blocks and the handwritten blocks, based on the separation coefficient calculated by the feature vectors aggregating unit 17 and the result of the analysis performed by the text structure analyzing unit 14.

The typed character recognizing unit 19 compares a clipped typed character pattern and a typed character pattern registered in the typing dictionary 21 by, e.g., a pattern matching method and outputs a character (its code) recognized from the highest similarity between both patterns.

The handwritten character recognizing unit 20 compares a clipped handwritten character pattern with a handwritten character pattern registered in the handwriting dictionary 22 by, e.g., the pattern matching method and outputs a character (its code) recognized from the highest similarity between both patterns.

For the typing dictionary 21 and the handwriting dictionary 22, electronic dictionaries stored in a storage medium such as a hard disk can be used.

The combining unit 23 combines characters recognized by the typed character recognizing unit 19 and characters recognized by the handwritten character recognizing unit 20 into, e.g., a single file and a single text image.

Figure 2B:
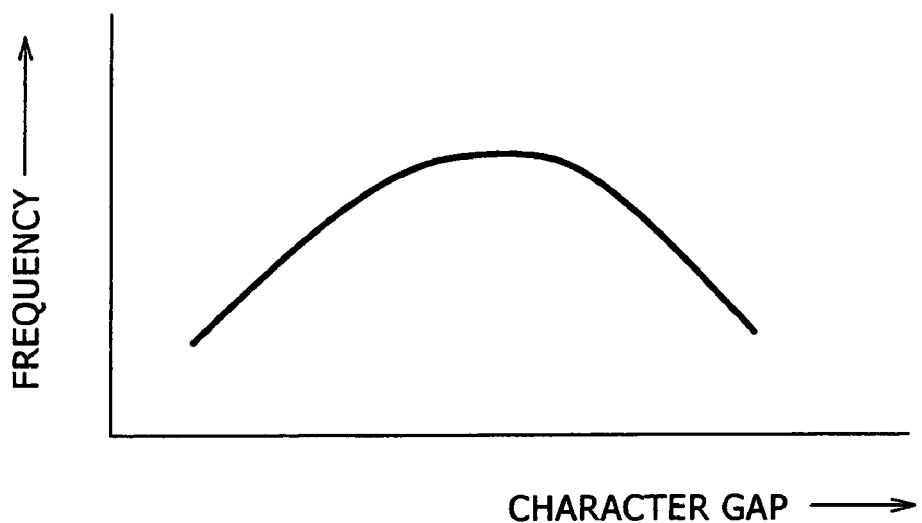

FIGS. 2A and 2B show graphs to explain the principle of calculating the feature vectors for the feature vectors calculating unit 16. The following discussion focuses on, among the feature vectors, character gap. The character gap is generally constant for typed characters, unless character points and character gap are changed manually. Thus, the character gap versus frequency characteristic curve, as shown in FIG. 2A, shows a sharp mountain shape with a peak. On the other hand, because it is difficult to hand write characters while keeping a constant gap between characters, the character gap versus frequency characteristic curve, as shown in FIG. 2B, shows a gently sloping mountain shape. The difference between both characteristic curves shown in FIGS. 2A and 2B can be used as a feature vector by which discrimination between typed characters and handwritten characters can be made. Although the character gap is discussed here, other feature vectors can be obtained in a similar fashion. The feature vectors aggregating unit 17 uses the feature vector whose calculation values for different text imaging regions show a distinct difference, as shown in FIGS. 2A and 2B, in determining the separation coefficient.

Figures 3A, 3B, 3C:
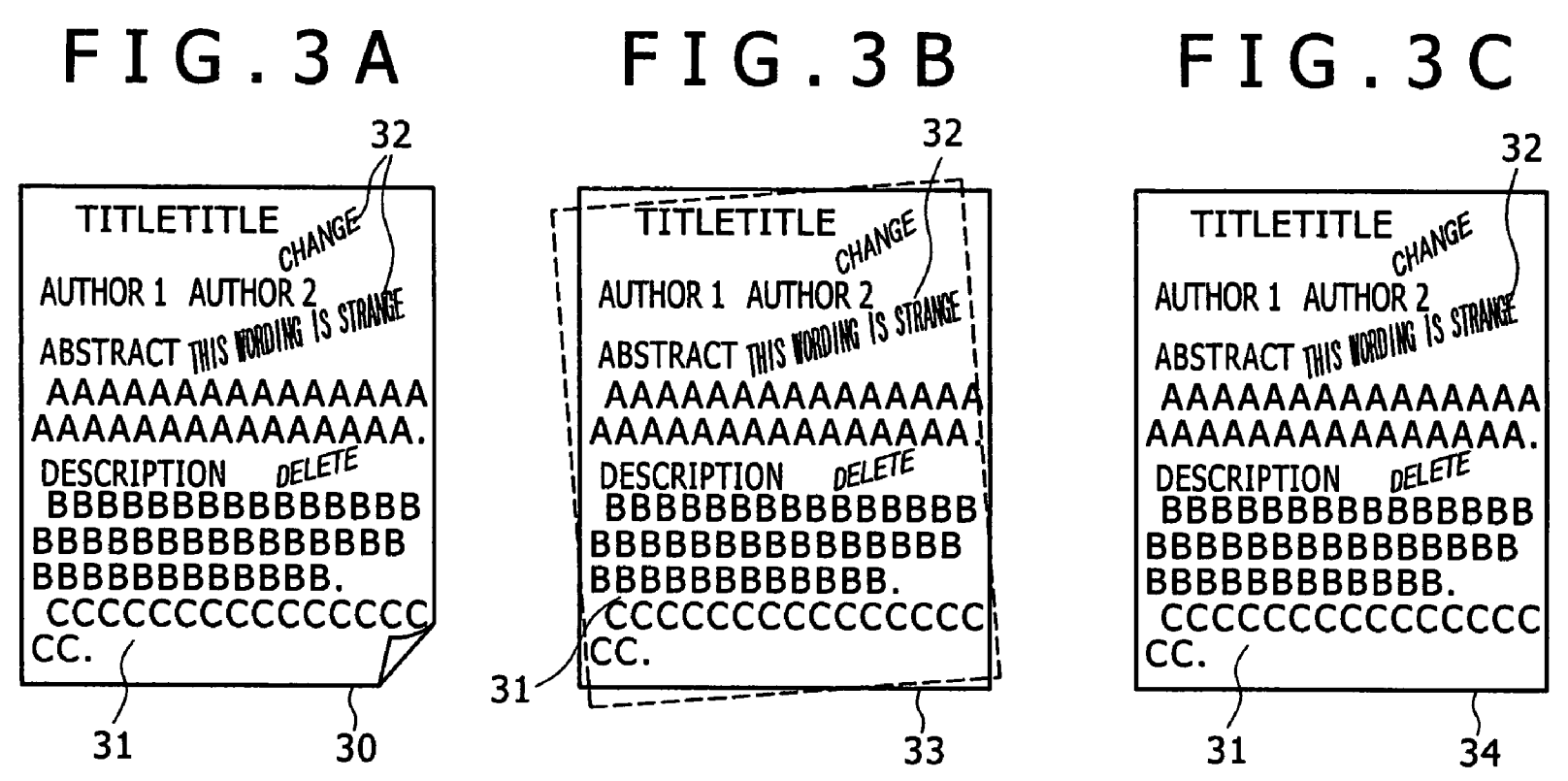
Figure 4:
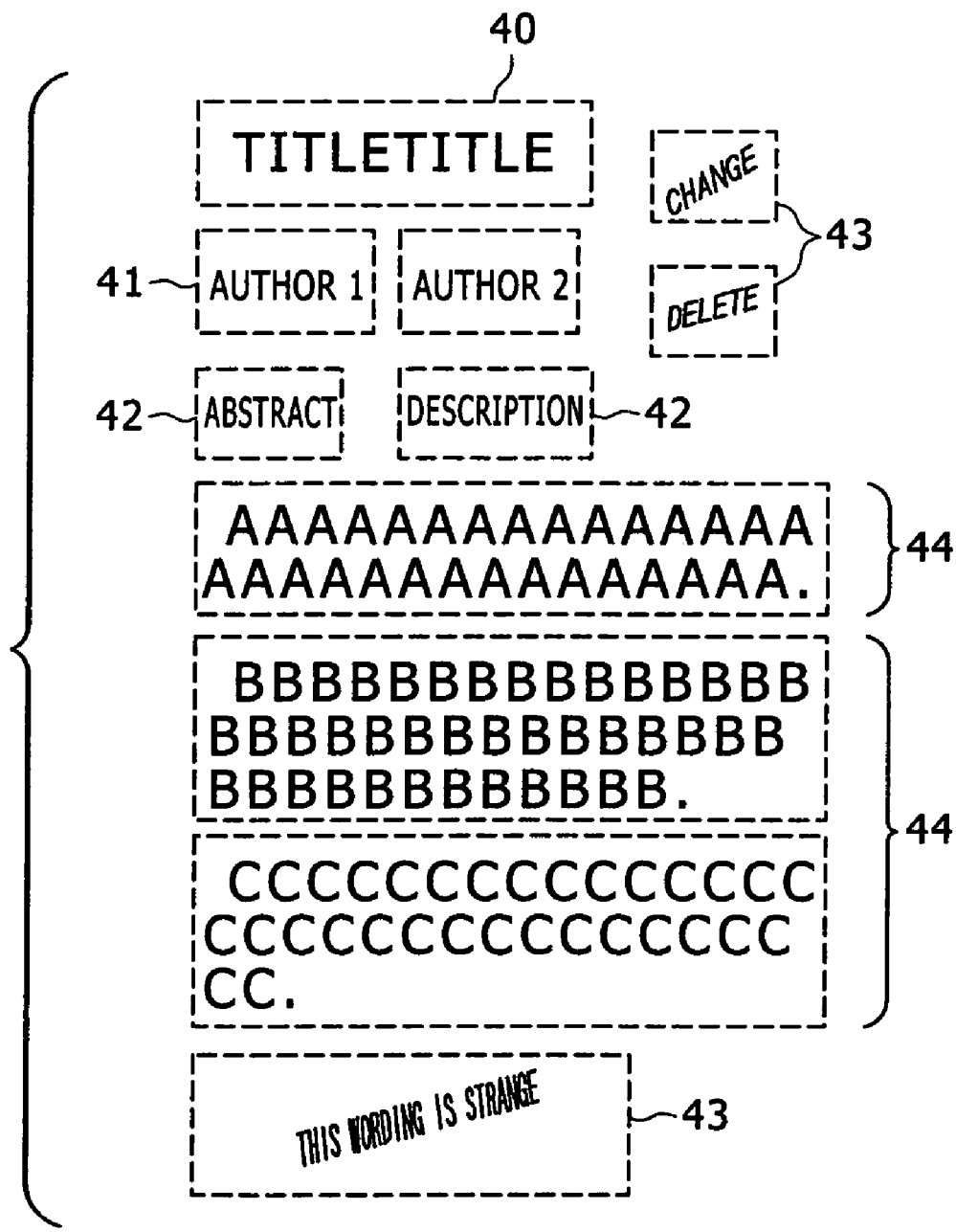
FIG. 4 illustrates an example of text structure analysis result.
Figure 5A:
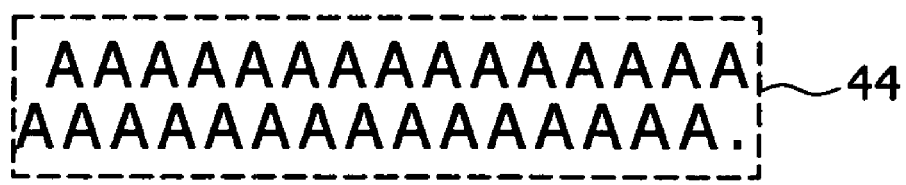
FIGS. 5A, 5B, and 5C illustrate text and character clipping, wherein 5A illustrates a text block clip, 5B illustrates a line clip, and 5C illustrates a character clip.
Figure 5B:
Figure 5C:
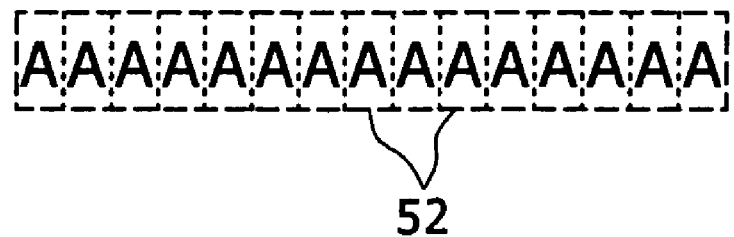
Figure 6A:
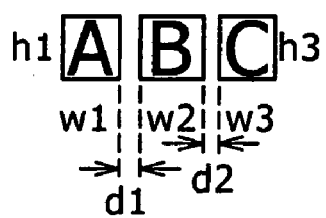
FIGS. 6A, 6B, and 6C illustrate the calculations of feature vectors, wherein 6A illustrates the calculations of feature vectors in terms of character height, width, and gap, 6B illustrates the calculation of a feature vector in terms of centroid, and 6C illustrates the calculation of a feature vector in terms of writing direction of a row.
Figure 6B:
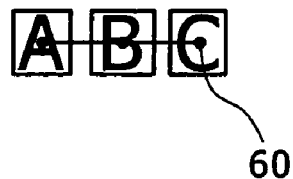
Figure 6C:
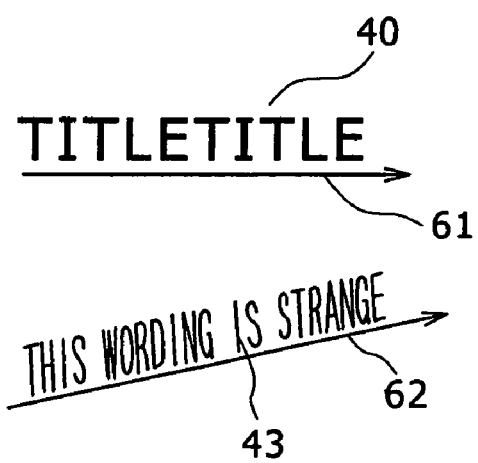
Figure 7A:
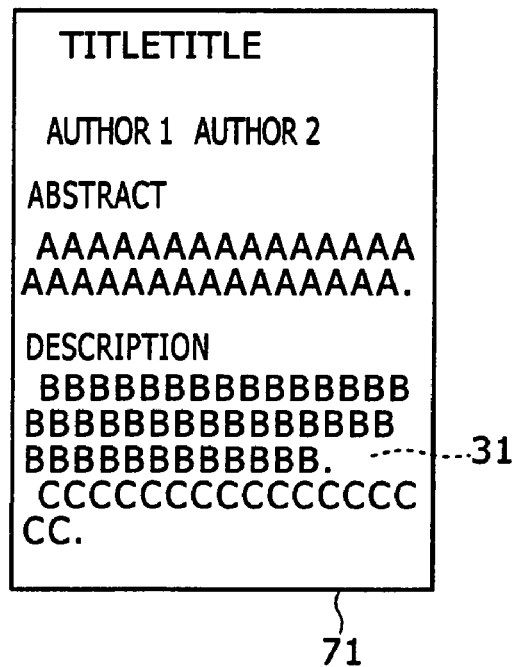
FIGS. 7A and 7B show text images output by a typed and handwritten character separation unit, wherein 7A shows a text image with typed characters only and 7B a text image with handwritten characters only.
Figure 7B:
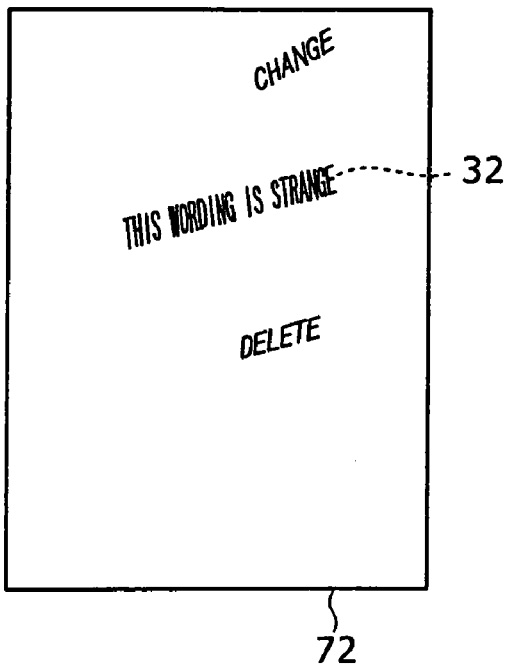

FIGS. 3A to 3C show a text image to be processed by the component units shown in FIG. 1. FIGS. 4 through 7A and 7B respectively show the results processed by each of the units in FIG. 1. FIG. 4 illustrates an example of the result of the text structure analysis. FIGS. 5A to 5C illustrate a region clip, a line clip, and a character clip. FIGS. 6A to 6C illustrate the calculations of the feature vectors. FIGS. 7A and 7B show text images output by the typed and handwritten character separation unit 18. Referring to FIGS. 1 through 7A and 7B, the operation of the character recognizing apparatus 1 is described below.

First, the image input unit 11 scans an input manuscript page 30 shown in FIG. 3A composed mainly of typed characters 31 and including handwritten characters 32 also and captures an input text image 33 shown in FIG. 3B. If the input manuscript page 30 is correctly set on the platen surface of a scanner, not shown, of the image input unit 11, the input text image 33 is aligned in position indicated by a solid line frame in FIG. 3B. However, if the input manuscript page 30 is skewed when placed on the platen surface of the scanner, the entire input text image 33 is skewed, as indicated by a dotted line frame. Such a skewed input text image 33 causes errors in the layout analysis and the calculations of the feature vectors. In that event, the distortion correcting unit 12 corrects the skew of the input text image 33 and outputs a skew corrected text image 34 shown in FIG. 3C.

If a color manuscript page 30 is input, the distortion correcting unit 12 executes processing for converting the R, G, and B color components into gray. This conversion decreases the amount of the image data and helps facilitate the following binarizing process.

Then, the binarizing unit 13 binarizes the text image of FIG. 3C. On the binarized text image, the text structure analyzing unit 14 executes a layout analysis by dividing the text image into text imaging regions, regions for different types such as text, figure, and photograph, lines, etc.

FIG. 4 illustrates an example of the result of the layout analysis, wherein the text image is divided into rough blocks including a title block 40, author blocks 41 for author names and the like, heading blocks 42 for abstract and description, non-typed blocks 43 involving handwritten characters, figures, etc. other than typed characters, and text body blocks 44.

From a text block clip 44 shown in FIG. 5A corresponding to a text body block 44 in FIG. 4, the text structure analyzing unit 14 further clips every line of text, as shown in FIG. 5B.

Next, from a line clip of text clipped by the text structure analyzing unit 14, the character clipping unit 15 clips characters one by one. For example, from a line clip 51 shown in FIG. 5B, a character clip 52 for each character is generated, as shown in FIG. 5C.

Next, the feature vectors calculating unit 16 calculates feature vectors for the above five feature components for each text imaging region, referring to the result of the analysis performed by the text structure analyzing unit 14, density values in the text image output by the distortion correcting unit 12, and the characters clipped by the character clipping unit 15.

Explaining the calculations of the feature vectors with reference to FIGS. 6A to 6C, for a string of example characters "A," "B," and "C" illustrated in FIG. 6A, the height h and the width w of each character and the character gap d between two succeeding characters are calculated. For example, if these characters are typed ones, the feature vector characteristic curve shown in FIG. 2A can be obtained. By comparison among the vector values of the characters, if $h1 \approx h2 \approx h3$, $w1 \approx w2 \approx w3$, and $d1 \approx d2 \approx d3$, the characteristic curve shown in FIG. 2A is obtained and, therefore, it is determined that the characters "A," "B," and "C" are typed ones.

When the feature vector in terms of centroid is calculated, as shown in FIG. 6B, feature vector calculation scan be obtained, indicating that the centroid 60 hardly varies for typed characters, whereas it significantly varies (changes) for handwritten characters.

When the feature vector in terms of the writing direction (angle) of a row is calculated, as shown in FIG. 6C, feature vector calculations for typed and handwritten characters can be obtained, reflecting that the writing direction 61 of the row of a typed title block 40 is horizontal, whereas the writing direction 62 of the row of a non-typed block 43 is angled.

The feature vectors aggregating unit 17 aggregates the feature vectors calculated by the feature vectors calculating unit 16 for each block shown in FIG. 4 over the entire text image and obtains the separation coefficient for separating typed characters and handwritten characters.

Based on the separation coefficient obtained by the feature vectors aggregating unit 17, the typed and handwritten character separation unit 18 then determines whether the characters in each block shown in FIG. 4 are typed or handwritten and separates the text image into a text image with typed characters only 71 shown in FIG. 7A and a text image with handwritten characters only 72 shown in FIG. 7B. In this instance, among the feature vectors obtained for the above plural feature components, a feature vector representing a distinctive feature like the characteristic curve shown in FIG. 2A is chosen and separation is performed.

Next, the typed character recognizing unit 19 and the handwritten character recognizing unit 20 execute OCR processing respectively on the text image with typed characters only 71 and the text image with handwritten characters only 72, separated as shown in FIGS. 7A and 7B, using respectively the typing dictionary 21 and the handwriting dictionary 22, and generate the thus recognized characters and images.

The combining unit 23 combines the characters recognized by OCR processing on the text image with typed characters only 71 and the text image with handwritten characters only 72 into a single text image in which the characters are placed in the same layout as the input manuscript page 30 shown in FIG. 3A. When this combined text image is printed with a printer or the like, a page of typed text in which handwritten characters have been converted to typed characters can be obtained.

This embodiment yields the following effects:

(a) The text structure analyzing unit 14 calculates plural feature vectors per block in the text image and obtains the separation coefficient by statistical reference to the calculated plural feature vectors. Based on this separation coefficient, discrimination and separation between typed and handwritten characters are performed. Thus, the precision of the separation can be enhanced.

(b) Because of using plural different feature vectors, reliable calculations of the feature vectors of text can be obtained. Reliable discrimination and separation between typed and handwritten characters can be performed.

(c) The feature vectors aggregating unit 17 aggregates the feature vectors over the entire text image, based on which, separation between typed and handwritten characters is performed. Thus, the rate of recognition of handwritten characters can be enhanced.

(d) Because the distortion correcting unit 12 corrects a skew of the input text image 33, the feature vectors can be calculated correctly even if a skewed text page is scanned. Thus, the rate of recognition of characters can be enhanced.

As described above, the present invention provides an apparatus for recognizing characters including a text structure analyzing unit that analyzes an input image of text composed of mixed typed and handwritten characters and separates the input text image into predefined text imaging regions, a character clipping unit that clips characters one by one in each of the text imaging regions separated by the text structure analyzing unit, a feature vectors calculating unit that calculates feature vectors of the clipped characters for each of the text imaging regions, a feature vectors aggregating unit that aggregates the calculated feature vectors over a predefined range of the input text image, and a typed and handwritten character separation unit that separates characters involved in the input text image into the typed characters and the handwritten characters, based on a result of the aggregation by the feature vectors aggregating unit.

By calculating the feature vectors for each text imaging region and aggregating them, e.g., a separation coefficient for separating typed characters and handwritten characters can be obtained. By this separation coefficient, separation between the typed characters and handwritten characters can be performed precisely.

The distortion correcting unit that performs distortion correction such as skew correction and noise removal on the input text image may be connected at a preceding stage to the text structure analyzing unit. In general, text is composed mainly of typed characters. The skew correction corrects the writing direction of every row of typed characters, but a skew in the writing direction of every row of handwritten characters still remains. Therefore, by calculating the feature vectors of the writing direction of a row, it will be easy to separate typed characters and handwritten characters.

The text structure analyzing unit may divide the text image into the predefined text imaging regions by dividing the text image into paragraph or line regions or dividing into regions for different types such as at least one of text, figure, and photograph.

The feature vectors calculating unit may calculate plural feature vectors for each of the text imaging regions. In particular, for instance, the feature vectors calculating unit may calculate the feature vectors in terms of at least one of character size uniformity, character density uniformity, character pitch, centroid or a center of a circumscribed quadrangle of a character, a writing direction (angle) of a row or column, and a histogram of values of pixels. Thereby, highly precise aggregation results can be obtained.

The feature vectors aggregating unit may aggregate the feature vectors for each of the text imaging regions over the entire input text image. Thereby, highly precise aggregation results can be obtained.

The feature vectors aggregating unit may calculate a separation coefficient for separating typed characters and handwritten characters, based on the result of the aggregation of the feature vectors.

The feature vectors calculating unit may calculate the plural feature vectors for each of the text imaging regions, the feature vectors aggregating unit may obtain the separation coefficient including plural intermediate estimates of likely typed characters or likely handwritten characters for each of the plural feature vectors, and the typed and handwritten character separation unit may separate typed characters and handwritten characters, based on the plural intermediate estimates. Thereby, separation between typed and handwritten characters can be performed even if it is impossible to make the separation by a threshold. For example, if, for a block of characters, plural intermediate estimates of likely handwritten characters appear from the aggregations of plural feature vectors of the characters, the characters can be determined as handwritten ones.

The typed and handwritten character separation unit may perform discrimination and separation between typed characters and handwritten characters on the input text image or a binarized text image of the input text image.

The present invention also provides a method for recognizing characters. The method is built up of analyzing an input image of text composed of mixed typed and handwritten characters and separating the input text image into predefined text imaging regions, clipping characters one by one in each of the text imaging regions separated, calculating feature vectors of the clipped characters for each of the text imaging regions, aggregating the calculated feature vectors over a predefined range of the input text image, and separating characters involved in the input text image into the typed characters and the handwritten characters, based on a result of the aggregation of the feature vectors.

The present invention also provides a computer readable medium storing a program for recognizing characters. The program causes a computer to perform the following operations: analyzing an input image of text composed of mixed typed and handwritten characters and separating the input text image into predefined text imaging regions; clipping characters one by one in each of the text imaging regions separated; calculating feature vectors of the clipped characters for each of the text imaging regions; aggregating the calculated feature vectors over a predefined range of the input text image; and separating characters involved in the input text image into the typed characters and the handwritten characters, based on a result of the aggregation of the feature vectors.

According to an embodiment of the invention, the rate of recognition of handwritten characters in text composed of mixed typed and handwritten characters can be enhanced.

It will be appreciated that the present invention is not limited to the embodiment described hereinbefore and may be embodied in other modified forms without departing from its spirit or characteristics as defined in the appended claims and their equivalents. For instance, the image input unit 11 may be equipped with a function to judge the size of a manuscript page and, relative to the recognized size, the size of text images output by the typed and handwritten character separation unit 18 may be scaled up or down automatically, according to a preset condition. The text structure analyzing unit 14 may be arranged such that, if it detects that the text image includes a photograph or a figure, it outputs an extract image of the photograph or figure block separately from typed blocks and handwritten blocks.

The entire disclosure of Japanese Patent Application No. 2004-278133 filed on Sep. 24, 2004 including specification, claims, drawings and abstract is incorporated herein by reference in its entirety.

What is claimed is:

1. An apparatus for recognizing characters comprising:
   a text structure analyzing unit that analyzes an input image of text composed of mixed typed and handwritten characters and separates the input text image into predefined text imaging regions;
   a character clipping unit that clips characters one by one in each of the text imaging regions separated by the text structure analyzing unit;
   a feature vectors calculating unit that calculates feature vectors of the clipped characters for each of the text imaging regions in terms of a centroid or a center of a circumscribed quadrangle of a character;
   a feature vectors aggregating unit that aggregates the calculated feature vectors over the plurality of text image regions; and
   a typed and handwritten character separation unit that separates characters involved in the input text image into the typed characters and the handwritten characters, based on a result of the aggregation by the feature vectors aggregating unit.

2. The apparatus according to claim 1, wherein a distortion correcting unit that performs distortion correction which is at least one of skew correction and noise removal on the input text image is connected at a preceding stage to the text structure analyzing unit.

3. The apparatus according to claim 1, wherein the text structure analyzing unit divides the text image into the predefined text imaging regions by dividing the text image into paragraph or line regions or dividing into regions for different types such as at least one of text, figure, and photograph.

4. The apparatus according to claim 1, wherein the feature vectors calculating unit calculates a plurality of the feature vectors for each of the text imaging regions.

5. The apparatus according to claim 1, wherein the feature vectors calculating unit calculates the feature vectors in terms of character size uniformity, character density uniformity, character pitch, centroid or a center of a circumscribed quadrangle of a character, a writing direction of a row or column, and a histogram of values of pixels.

6. The apparatus according to claim 1, wherein the feature vectors aggregating unit aggregates the feature vectors for each of the text imaging regions over the entire input text image.

7. The apparatus according to claim 1, wherein the feature vectors aggregating unit calculates a separation coefficient for separating typed characters and handwritten characters, based on the result of the aggregation of the feature vectors.

8. The apparatus according to claim 7,
   wherein the feature vectors calculating unit calculates the plurality of the feature vectors for each of the text imaging regions,
   the feature vectors aggregating unit obtains the separation coefficient including a plurality of intermediate estimates of likely typed characters or likely handwritten characters for each of the plurality of the feature vectors, and
   the typed and handwritten character separation unit separates typed characters and handwritten characters, based on the plurality of intermediate estimates.

9. The apparatus according to claim 1, wherein the typed and handwritten character separation unit performs discrimination and separation between typed characters and handwritten characters on the input text image or a binarized text image of the input text image.

10. A method for recognizing characters comprising:
    analyzing an input image of text composed of mixed typed and handwritten characters and separating the input text image into predefined text imaging regions;
    clipping characters one by one in each of the text imaging regions separated;
    calculating feature vectors of the clipped characters for each of the text imaging regions in terms of a centroid or a center of a circumscribed quadrangle of a character;
    aggregating the calculated feature vectors over the plurality of text image regions; and
    separating characters involved in the input text image into the typed characters and the handwritten characters, based on a result of the aggregation of the feature vectors.

11. A computer readable medium storing a program for recognizing characters, the program comprising computer executable instructions causing a computer to perform operations comprising:
    analyzing an input image of text composed of mixed typed and handwritten characters and separating the input text image into predefined text imaging regions;
    clipping characters one by one in each of the text imaging regions separated;
    calculating feature vectors of the clipped characters for each of the text imaging regions in terms of a centroid or a center of a circumscribed quadrangle of a character;
    aggregating the calculated feature vectors over the plurality of text image regions; and
    separating characters involved in the input text image into the typed characters and the handwritten characters, based on a result of the aggregation of the feature vectors.

12. An apparatus for recognizing characters, comprising:
    a text structure analyzing unit that analyzes an input image of text comprising mixed typed and handwritten characters and separates the input text image into a plurality of text imaging regions;
    a feature vectors calculating unit that calculates feature vectors of the text imaging regions in terms of a centroid or a center of a circumscribed quadrangle of a character, respectively;
    a feature vectors aggregating unit that aggregates the feature vectors for each of the text imaging regions over the entire input text image, and calculates a separation coefficient for separating typed characters and handwritten characters, based on the result of the aggregation of the feature vectors; and
    a typed and handwritten character separation unit that separates characters involved in the input text image into the typed characters and the handwritten characters, based on the separation coefficient.

* * * * *